E. W. CAMPBELL AND M. W. RAMSEY.
BATTERY PLATE BURNING RACK.
APPLICATION FILED NOV. 26, 1920.
1,396,162.
Patented Nov. 8, 1921.
2 SHEETS—SHEET 1.
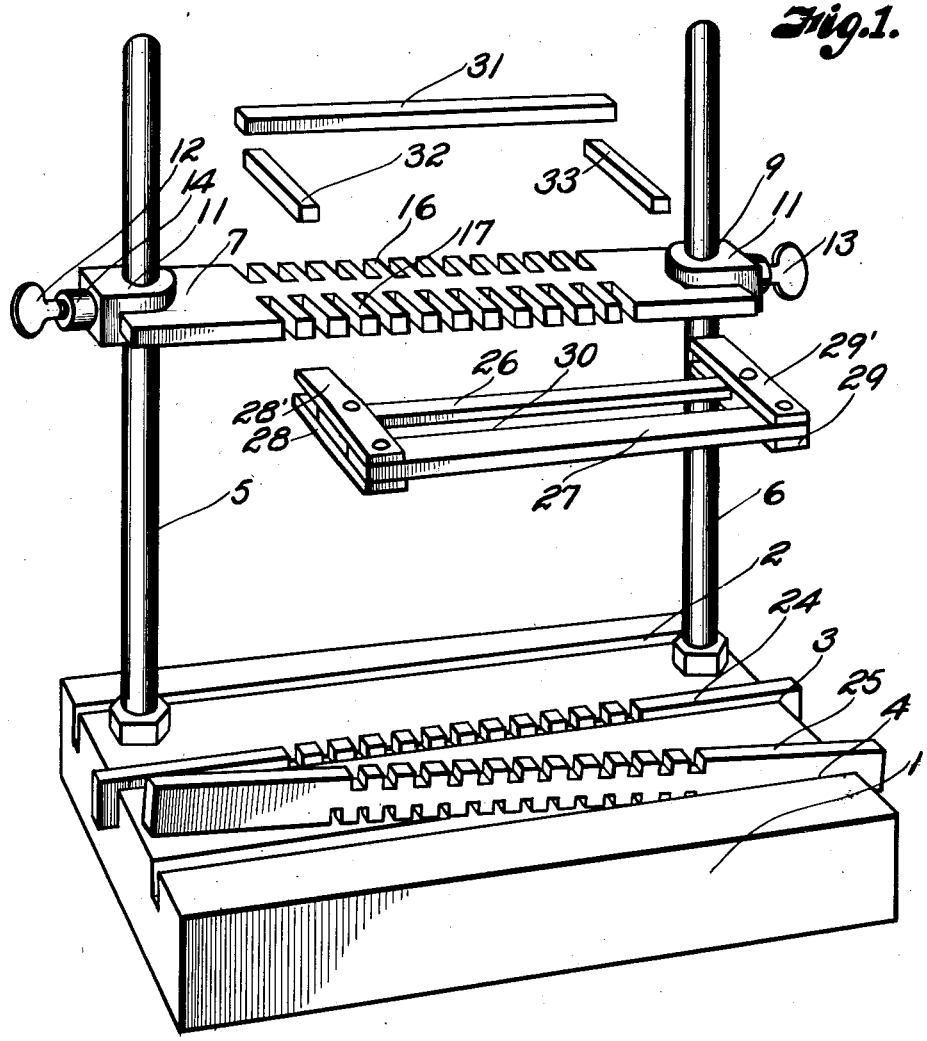
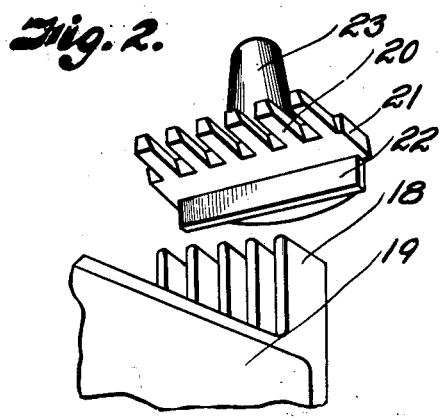
Inventor
Edgar W. Campbell.
Milton W. Ramsey.
By
Attorney E. W. CAMPBELL AND M. W. RAMSEY.
BATTERY PLATE BURNING RACK.
APPLICATION FILED NOV. 26, 1920.

1,396,162.

Patented Nov. 8, 1921.

Inventor
Edgar W. Campbell.
Milton W. Ramsey.

By Arthur E. Brown

Attorney

UNITED STATES PATENT OFFICE.

EDGAR W. CAMPBELL AND MILTON W. RAMSEY, OF KANSAS CITY, MISSOURI, ASSIGNORS TO CAMPBELL ENGINEERING CORPORATION, OF KANSAS CITY, MISSOURI, A CORPORATION OF MISSOURI.

BATTERY-PLATE-BURNING RACK.

1,396,162.   Specification of Letters Patent.   Patented Nov. 8, 1921.

Application filed November 26, 1920. Serial No. 426,670.

*To all whom it may concern:*

Be it known that we, EDGAR W. CAMPBELL and MILTON W. RAMSEY, citizens of the United States, residing at Kansas City, in the county of Jackson and State of Missouri, have invented certain new and useful Improvements in Battery-Plate-Burning Racks; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to plate burning racks involving a construction in which means is provided for autogenously soldering the terminals to the plates of a storage battery cell.

As is well known, storage battery plates are arranged in groups of positive and groups of negative plates, each group being provided with a terminal. The grids are usually formed by molding or pressing into shape, each having an upstanding projection at an upper corner. The projections are then alined and the plates are held in spaced relation while a terminal for a group of plates is fastened thereto. A group of positive plates is arranged to interleave with a group of negative plates with separators between them.

Our invention contemplates the provision of means whereby the plates may be held in proper spaced relation with respect to one another and whereby the terminal may be efficiently supported while the so-called burning or autogenous welding of the terminal to the plate projection is effected.

The invention consists in certain novel parts and arrangement of parts as will be pointed out in the following claims, the specific embodiment hereinafter described being illustrated in the accompanying drawings, in which—

Figure 1 is a disassociated view of a plate rack constructed in accordance with my invention.

Fig. 2 is a disassociated fragmentary view of a group of plates and a terminal separated therefrom.

Figure 3:
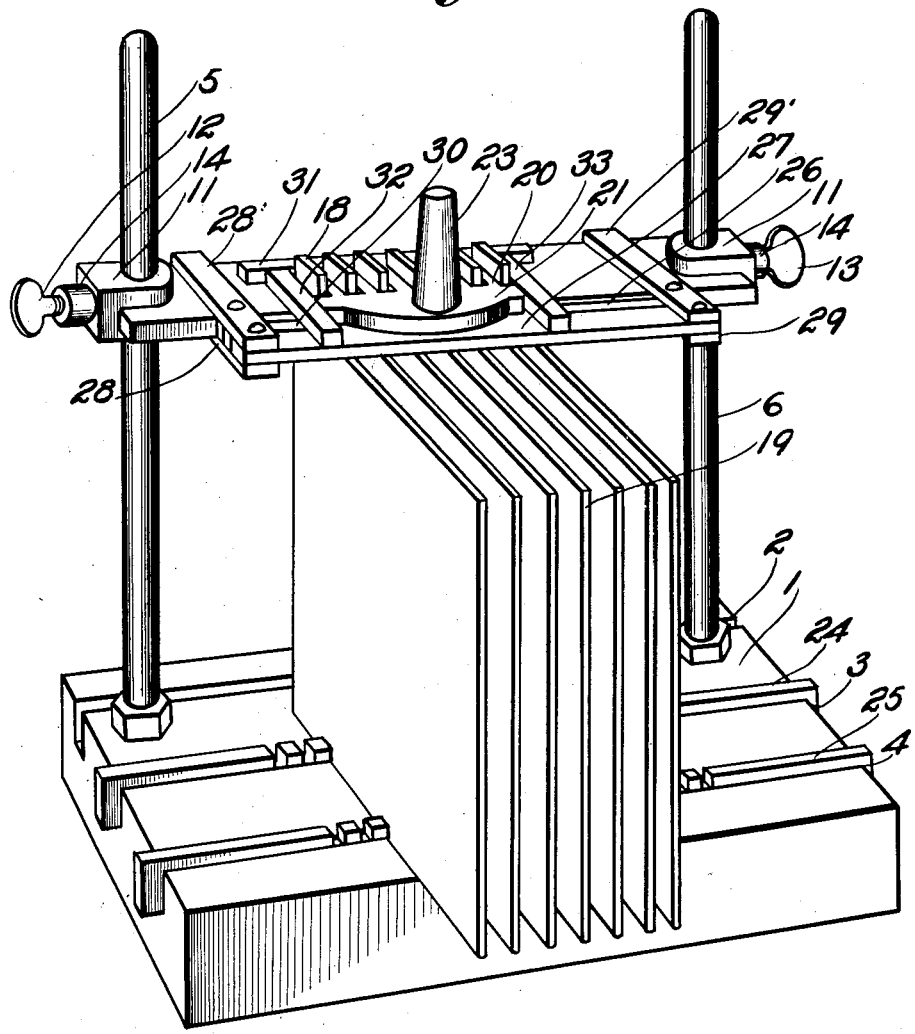
Fig. 3 is a perspective view of the rack set up with the plates and terminal in position to be connected one to the other.
Figure 4:
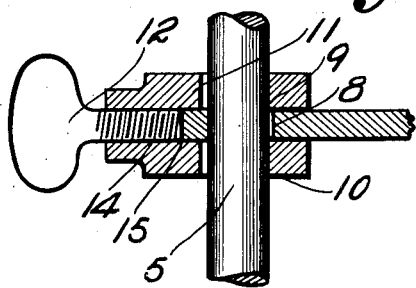
Fig. 4 is a vertical, sectional view through a standard gripping device for positioning the comb or positioning bar on the standards so that it will be in the proper relative relation to the plate.

Referring now to the drawings by numerals of reference:

1 designates a base or block which may consist of wood or suitable material and which is provided with a plurality of parallel longitudinal slots; in the present instance three, designated 2, 3 and 4 respectively. The block supports two upstanding rods 5 and 6 which constitute standards upon which a comb or positioning bar 7 may be vertically adjusted. The horizontal comb or positioning bar 7 is provided at its opposite ends with holes or through openings 8 with which complementary alining openings 9 and 10 in a bifurcated clamp 11 are adapted to aline. One of the rods, as for example, the rod 5, in Fig. 4, projects through all three openings, the clamp being adapted to bind against the rod when the thumb screw 12 for clamp on rod 5 or the thumb screw 13 for the clamp on rod 6 is screwed into the threaded portion 14 of the clamp so that the end 15 will bear against the edge of the comb or bar 7. The screwing down of the thumb screw will cause the end 15 to bear against the end of the comb and effect a sliding movement of the clamp so that the edges 9 and 10 will bind against the rod or standard 5 or 6, as the case may be. This arangement causes a more efficient frictional binding between the clamp and the standard than could be accomplished by simply introducing a thumb screw which would have a tendency to mar and score the standards which support the horizontal comb.

By loosening the thumb screw 12 or 13, the comb and its clamps can be readily slid upon the standards 5 and 6 to raise and lower it. Then the thumb screws can be operated to cause the clamps again to engage the standards and hold the comb in place.

The comb is preferably provided with two rows of outwardly projecting teeth, the rows being designated 16 and 17 respectively. The spaces between the comb teeth are for the purpose of receiving the upstanding projections 18 on the grids 19, which extend through the spaces and between the laterally projecting teeth 20 on the base block 21 of the terminal, the base block having a depending portion 22 which constitutes a stop for the separators between the grids and prevents their rising in the battery cells.

The base 21 also carries a post 23, which constitutes the terminal for engagement by the conductors, as will be well understood. The grooves 3 and 4 are shown as provided with longitudinally adjustable and reversible vertical combs 24 and 25 which receive the lower edges of the plates and hold them in spaced relation, the spaces between the teeth of the combs 24 and 25 corresponding with the spaces between the comb teeth on the comb 7, which are to be used at any particular time.

The purpose of making the comb 7 reversible and the combs 24 and 25 reversible is to provide for plates of different thicknesses, it being desirable that the spaces between the upstanding projections 18 be substantially equal to the widths of the teeth 20 on the terminal.

When the terminal block is set upon the support or comb 7, a positioning bracket and support is employed to receive the base block 21. The bracket is shown as consisting of a frame comprising the longitudinal bars 26 and 27 connected by the pairs of clamping fingers 28 and 28' and 29 and 29'. The pairs of clamping fingers are riveted or otherwise secured to the bar 26 so that the distance between the fingers will be approximately that of the thickness of the comb 7 so that the fingers will grip the comb to hold the bracket connected thereto, as it serves as a support for the base block 21.

The bars 26 and 27 are spaced apart as shown in Fig. 1, so that when the inner edge of the bar 26 lies against the ends of the comb teeth, the depending flange or projection 22 will rest within the slot 30. Then stops are laid upon the comb and bracket, for example, a relatively long stop comprising a bar 31 will be laid along the outer edges of the projections 18 and a pair of side stops comprising shorter bars 32 and 33 will lie transversely of the comb 7 and bracket to constitute end stops, the projections 18 being thus framed in as shown in Fig. 3. Then the base block 21 is burned to the ends 18 of the plates 19 in the usual manner by what is commonly known as autogenous soldering. Therefor, the unit is made up of a plurality of plates connected to a single terminal.

When the burning has been completed, the plates will be removed from the rack and the projection 22 will be sprung slightly to permit it to be disengaged from between the edges of the slot 30. The unit is now ready to be placed into a storage battery.

If unusually wide plates are to be attached to a terminal, a comb may be placed in the slot 2 to position the plates and the bracket may be engaged on the outer side of the comb 7 to support the block 21 of the terminal.

It will be apparent that the construction of the burning rack is quite flexible in that it permits the utilization of various sizes of plates and terminals and that the terminals may be efficiently attached to the projections of the plates to secure them in groups; also that, except for springing the base 21 out of engagement with the bracket, the disassembling of the machine can be easily accomplished, it being only necessary to move away the stop 31 to 33 after the autogenous soldering or burning has been completed to withdraw the unit from the rack.

The utilization of a burning rack such as described and illustrated in the present application will afford a smooth, neat union between the terminal and the plates. It will also be apparent that the adjustment of the horizontal rack may be easily effected by loosening the thumb screws as above described. The comb 7 need not tightly bind the standards because the clamping is accomplished by means of the clamps binding against the standards and the lower portion of each bifurcated clamp serving as a support for the comb 7.

What we claim and desire to secure by Letters-Patent is:

1. A plate burning rack comprising a base having plate-positioning combs, and an additional comb supported above the base and adjustable in relation thereto.

2. A plate burning rack comprising a base having longitudinal grooves, adjustable combs in said grooves, and an adjustable comb supported above the base.

3. A plate burning rack comprising a base having parallel grooves, combs in said grooves having upstanding teeth, and an additional comb complementary to the first named combs and having laterally projecting teeth.

4. A plate burning rack comprising a base having parallel grooves, combs in said grooves having upstanding teeth, an additional comb complementary to the first named combs and having laterally projecting teeth, and means for vertically adjusting the last named comb with respect to the first named comb.

5. A plate burning rack comprising a base having parallel grooves, adjustable and reversible combs in said grooves, standards on the base, a comb having laterally projecting teeth, and means for adjusting the comb on the standard.

6. A plate burning rack comprising a base having combs therein with upstanding teeth, standards on the base comprising rods, bifurcated clamps having openings through which the standards project, a comb on the standards having openings through which the standards project, the comb being interposed between the bifurcations of the clamps, and a thumb screw for each clamp bearing against an end of the comb and adapted to be operated whereby the edges of the openings in its clamp will bind against the standard.

7. A plate burning rack comprising a base, upstanding combs in said base, standards projecting from said base, a vertically adjustable comb carried by the standards, and a removable terminal-block-supporting clamp engageable with the adjustable comb.

8. A plate burning rack comprising a base, upstanding combs in said base, standards projecting from said base, a vertically adjustable comb carried by the standards, and a removable terminal-block-supporting clamp engageable with the adjustable comb, said clamp comprising a frame having pairs of parallel comb-engaging fingers at its respective ends.

9. A plate burning rack comprising a base, upstanding combs in said base, standards projecting from said base, a vertically adjustable comb carried by the standards, and a removable terminal-block-supporting clamp engageable with the adjustable comb, said clamp comprising a frame having pairs of parallel comb-engaging fingers at its respective ends, the frame having a slot to receive a depending separator-plate-guarding flange on the terminal to be connected to the storage battery plates.

In testimony whereof we affix our signatures.

EDGAR W. CAMPBELL.
MILTON W. RAMSEY.